US008463179B2

(12) United States Patent
Mohammadian

(10) Patent No.: US 8,463,179 B2
(45) Date of Patent: Jun. 11, 2013

(54) ELECTROMAGNETIC PATCH ANTENNA REPEATER WITH HIGH ISOLATION

(75) Inventor: Alireza Hormoz Mohammadian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 12/975,980

(22) Filed: Dec. 22, 2010

(65) Prior Publication Data

US 2012/0164942 A1    Jun. 28, 2012

(51) Int. Cl.
*H04Q 7/32*    (2006.01)

(52) U.S. Cl.
USPC ............... 455/17; 455/7; 455/11.1; 455/14; 455/15; 455/20; 370/310; 370/315; 370/316; 343/893; 343/702; 343/700 MS

(58) Field of Classification Search
USPC ............... 455/17, 7, 11.1, 12.1, 14, 15, 19, 455/20, 22, 25, 422.1, 403, 550.1, 575.1, 455/445; 370/310, 315, 316; 343/893, 702, 343/700 MS
See application file for complete search history.

(56) References Cited

U.S. PATENT DOCUMENTS

| 7,592,969 | B2 | 9/2009 | Proctor, Jr. et al. | |
|---|---|---|---|---|
| 2004/0017314 | A1 | 1/2004 | Petropolous | |
| 2006/0205342 | A1 | 9/2006 | McKay, Sr. et al. | |
| 2007/0060046 | A1* | 3/2007 | Lee et al. ......................... | 455/7 |
| 2010/0029197 | A1* | 2/2010 | Judd et al. ..................... | 455/11.1 |
| 2010/0284445 | A1 | 11/2010 | Barriac et al. | |
| 2011/0001682 | A1* | 1/2011 | Rao ............................... | 343/893 |

FOREIGN PATENT DOCUMENTS

WO    2008073372 A2    6/2008

OTHER PUBLICATIONS

International Search Report and Written Opinion—PCT/US2011/066960—ISA/EPO—Apr. 4, 2012.
Sim et al., "Dual-Feed Dual-Polarized Patch Antenna With Low Cross Polarization and High Isolation", IEEE Transactions on Antennas and Propagation, vol. 57, No. 10, Oct. 1, 2009, pp. 3321-3324, IEEE Service Center, XP011271154, ISSN: 0018-926X, DOI: 10.1109/TAP.2009.2028702.

* cited by examiner

*Primary Examiner* — Keith Ferguson
(74) *Attorney, Agent, or Firm* — Thien T. Nguyen

(57) ABSTRACT

A repeater system is disclosed including a dual-fed donor patch antenna with a first microstrip antenna probe and a second microstrip antenna probe, phase shifting circuitry connected to the first microstrip antenna probe and the second microstrip antenna probe, wherein the phase shifting circuitry is configured to receive an input signal, supply a first signal to the first microstrip antenna probe, and supply a second signal to the second microstrip antenna probe using the input signal such that the first signal and the second signal are approximately 180 degrees out of phase with respect to each other. The repeater system also includes a coverage antenna (either a patch antenna or dipole antenna) and a housing connecting the dual-fed donor patch antenna and the coverage antenna. The housing is disposed to serve as a ground plane for the donor patch antenna and the coverage antenna.

20 Claims, 7 Drawing Sheets

ELECTROMAGNETIC PATCH ANTENNA REPEATER WITH HIGH ISOLATION

BACKGROUND

Repeaters are often used to extend the coverage area of a network and facilitate reception and transmission of signals in areas of inadequate network coverage. A simple repeater system is a type of bi-directional amplifier that includes a donor antenna, a coverage antenna (or sometimes referred to as a service antenna), and signal processing circuitry. In a typical arrangement, the donor antenna is a directional antenna pointing toward a signal source, and the coverage antenna is a rebroadcast antenna. The signal processing circuitry (which typically includes a signal amplifier) may be configured to provide gain (e.g., at least 10 dB of gain in most applications) to the received signal and prepare the signal for rebroadcasting. In addition to amplification, the signal processing circuitry may act on the physical signal itself to reshape, retime, filter, or perform any combination of these functions on the physical signal before the signal is rebroadcasted using the coverage antenna.

Repeaters may use the same frequency or different frequencies to receive and rebroadcast the signal. When a repeater uses the same frequency to receive and rebroadcast signals (sometimes called an "on-frequency" repeater), a high degree of isolation between the received and transmitted signals is important for stable operation of the repeater. In practice, isolation is generally achieved by physically separating the donor antenna from the coverage antenna. For example, isolation is generally proportional to the vertical and/or horizontal separation of the donor antenna and the coverage antenna. Increased isolation may also be achieved using various interference cancellation techniques (e.g., echo cancellation techniques) and proper selection and design of the antenna types for the donor and coverage antennas.

A high degree of isolation between the donor antenna signal and the coverage antenna signal is particularly difficult to achieve, however, when a highly compact form factor is desired. A highly compact form factor can be achieved by having the donor antenna and the coverage antenna positioned back-to-back in a single package or system. In such systems, a high degree of physical separation between the donor antenna and the coverage antenna is generally not practical or not possible.

Increased isolation between the donor antenna signal and the coverage antenna signal typically results in less signal interference between the two antennas, higher signal integrity, and improved signal strength, which may, in turn, result in increased battery life of a mobile device, decreased emitted radiation from the mobile device, and an overall improved user experience.

SUMMARY

A repeater system is provided that includes a dual-fed donor patch antenna with a first microstrip antenna probe and a second microstrip antenna probe. Phase shifting circuitry is connected to the first microstrip antenna probe and the second microstrip antenna probe, and the phase shifting circuitry is configured to receive an input signal, supply a first signal to the first microstrip antenna probe, and supply a second signal to the second microstrip antenna probe using the input signal such that the first signal and the second signal are approximately 180 degrees out of phase with respect to each other. The repeater system also included a coverage antenna and a housing connecting the dual-fed donor patch antenna and the coverage antenna.

In some embodiments, the coverage antenna is a dual-fed coverage patch antenna with a third microstrip antenna probe and a fourth microstrip antenna probe. The dual-fed donor patch antenna and the dual-fed coverage patch antenna may be disposed so that their respective radiations are cross-polarized (e.g., one of the patch antennas may be rotated 90 degrees with respect to the other patch antenna).

In some embodiments, the coverage antenna is a balanced dipole antenna. The balanced dipole antenna may include a quarter-wave balun printed on a first side of a printed circuit board (PCB) material and a feed trace printed on a second side of the PCB material. The feed trace may include at least three segments of microstrip lines, each segment comprising a different width corresponding to a different characteristic impedance level.

In some embodiments, the repeater system includes a first patch antenna with a first feed line and first and second feed probes. The repeater system also includes a second patch antenna with a second feed line and third and fourth feed probes, wherein the second patch antenna is disposed so that the first patch antenna and the second patch antenna generate orthogonal fields. A housing connects the first patch antenna and the second patch antenna and includes first and second phase shifting circuitry. The housing is disposed to provide a ground plane for the first patch antenna and the second patch antenna. The first phase shifting circuitry is configured to receive a first input signal on the first feed line, supply the first input signal to the first feed probe, phase shift the first input signal by approximately 180 degrees, and supply the first phase-shifted input signal to the second feed probe. The second phase shifting circuitry is configured to receive a second input signal on the second feed line, supply the second input signal to the third feed probe, phase shift the second input signal by approximately 180 degrees, and supply the second phase-shifted input signal to the fourth feed probe.

DETAILED DESCRIPTION

Figure 1:
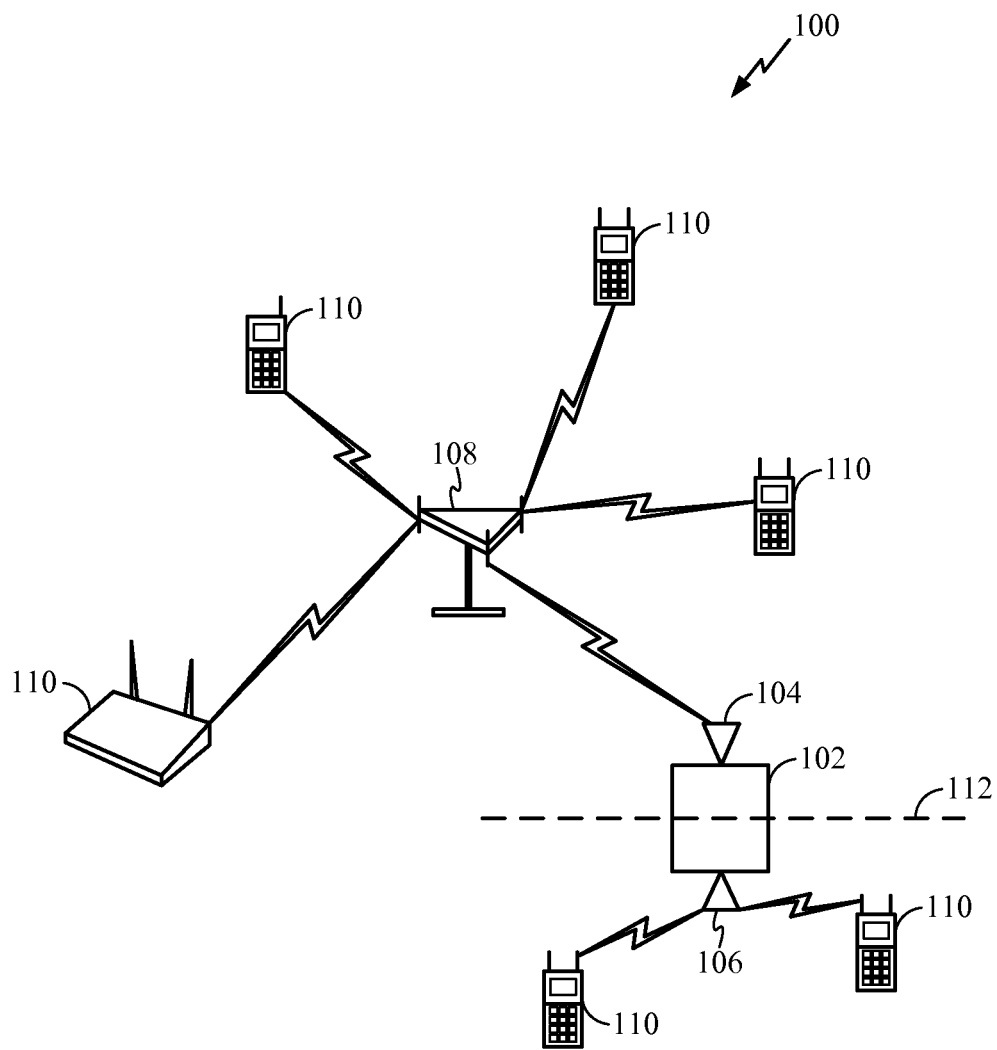
FIG. 1 is a block diagram of a wireless network implementing a repeater.

Antenna systems with high isolation for repeaters are disclosed. The antenna systems may include a donor antenna that receives a wireless signal from a transmitter (or series of transmitters) and a coverage antenna that retransmits or rebroadcasts the received wireless signal into an area of inadequate network coverage (e.g., an indoor area of a residence or an enterprise space). The coverage antenna may amplify, reshape, retime, filter, or otherwise enhance the wireless signal before retransmission.

For example, an example of an antenna system includes donor and coverage antennas that are located on opposite faces of a thin housing that contains repeater electronics. A first dual-fed patch antenna is used for the donor aperture, and a second dual-fed patch antenna is used for the coverage aperture. The first patch antenna is rotated 90 degrees in relation to the second patch antenna so that the first and second patch antennas generate orthogonal fields (e.g., their respective radiations are cross-polarized). Each of the first patch antenna and the second patch antenna include two symmetrically disposed microstrip antenna feed probes. The two microstrip antenna feed probes of each patch antenna may be fed 180 degrees out of phase in order to reduce (or eliminate) the radiation from the microstrip feed probes. Phase shifting circuitry (e.g., a rat-race circuit) may be connected to each feed line and each set of microstrip feed probes. The phase shifting circuitry may be configured to produce two feed signals shifted 180 degrees out of phase with respect to one another. The phase shifting circuitry may be attached under the ground planes of each patch antenna (e.g., within the thin housing) and may be further shielded to reduce or eliminate cross-talk between the two circuits. The first and second patch antennas may be configured to receive and retransmit a frequency band from 716 MHz to 728 MHz of forward link only (FLO) traffic.

As another example, instead of the second patch antenna described above, an antenna system uses a balanced dipole antenna. The balanced dipole antenna may be center-fed and printed on a printed circuit board (PCB) material, such as FR-4 epoxy. Two dipole wings (e.g., the poise and counterpoise) and a quarter-wave balun are printed on one side of the PCB material, and a feed trace is printed on the other side of the PCB material. The feed trace includes one or more segments of microstrip lines (e.g., three segments of microstrip lines) of varying widths corresponding to varying characteristic impedance levels. The quarter-wave balun may serve as the ground plane for the one or more segments of the microstrip lines. The balanced dipole antenna may be electromagnetically fed by the segment of microstrip line that crosses over the dipole gap. The impedance of the microstrip feed segment may match the impedance of the dipole antenna. Two small metallic tabs may be disposed on the lower edge of the dipole. These two tabs may be soldered to the ground plane in order to erect the balanced dipole antenna.

Signal or interference cancellation circuitry (e.g., echo cancellation circuitry) may be included in the thin housing that contains the repeater electronics and connects the donor and coverage antennas. It has been found that at least 10 dB of gain may be provided by either antenna design with at least 80 dB of total isolation (from both the antenna design and interference cancellation techniques) between the donor antenna signal and the coverage antenna signal, although these gain and isolation values are not required.

Two examples of antenna systems are described below for an on-frequency repeater system. Being designed for use in a FLO (e.g., MediaFLO™) network, the repeater systems operate with desired characteristics to cover FLO channels (former UHF TV channels) 55 and 56 which run from 716 MHz to 728 MHz. The antenna systems are designed to have desired gain, e.g., at least 10 dB, and desired isolation, e.g., 80 dB when combined with interference cancellation techniques, in order to be free from oscillations that can be caused by positive feedback. Both repeater antenna designs include a donor antenna (the antenna that receives signals from the base station or transmitter tower) and a coverage antenna (the antenna that transmits the amplified signal, e.g., within an enclosed, poor-coverage area such as indoor area of a residential or enterprise space).

FIG. 1 shows a wireless network 100 implementing a repeater 102. Wireless network 100 includes a wireless transceiver 108 (e.g., a base station, radio tower, or distribution center) that communicates with mobile stations 110 located in a coverage area of wireless network 100. Wireless transceiver 108 may be a wireless transmitter configured to transmit signals only. For example, wireless transceiver 108 may be a MediaFLO™ antenna configured to transmit or broadcast audio, video, and data over FLO channels (former UHF TV channels) 55 and 56 which run from 716 MHz to 728 MHz. Wireless transceiver 108 may additionally or alternatively be configured to transmit and/or receive other suitable types of signals over any other suitable frequency or frequencies.

Repeater 102 includes a donor antenna 104 and a coverage antenna 106. Donor antenna 104 is preferably located facing an area of adequate network coverage (e.g., facing an area where the signal exceeds a specified threshold) while coverage antenna 106 may be facing an area of inadequate network coverage (e.g., facing an area where the signal does not exceed the same specified threshold or some different threshold). For example, donor antenna 104 may be an external antenna located outside of building periphery 112 and coverage antenna 106 may be an internal antenna located inside of building periphery 112. Wireless transceiver 108 may communicate with mobile stations 110 over any suitable wireless channels, such as frequency-division duplexed (FDD) channels.

Mobile stations 110 may include any wireless devices, including cellular telephones, personal digital assistants (PDAs), portable computers, wireless access points, telemetry devices, and any combination of the foregoing, that are capable of receiving signals from wireless transceiver 108 via wireless links. Mobile stations 110 may also include other types of wireless access terminals, including fixed wireless terminals.

Figure 2:
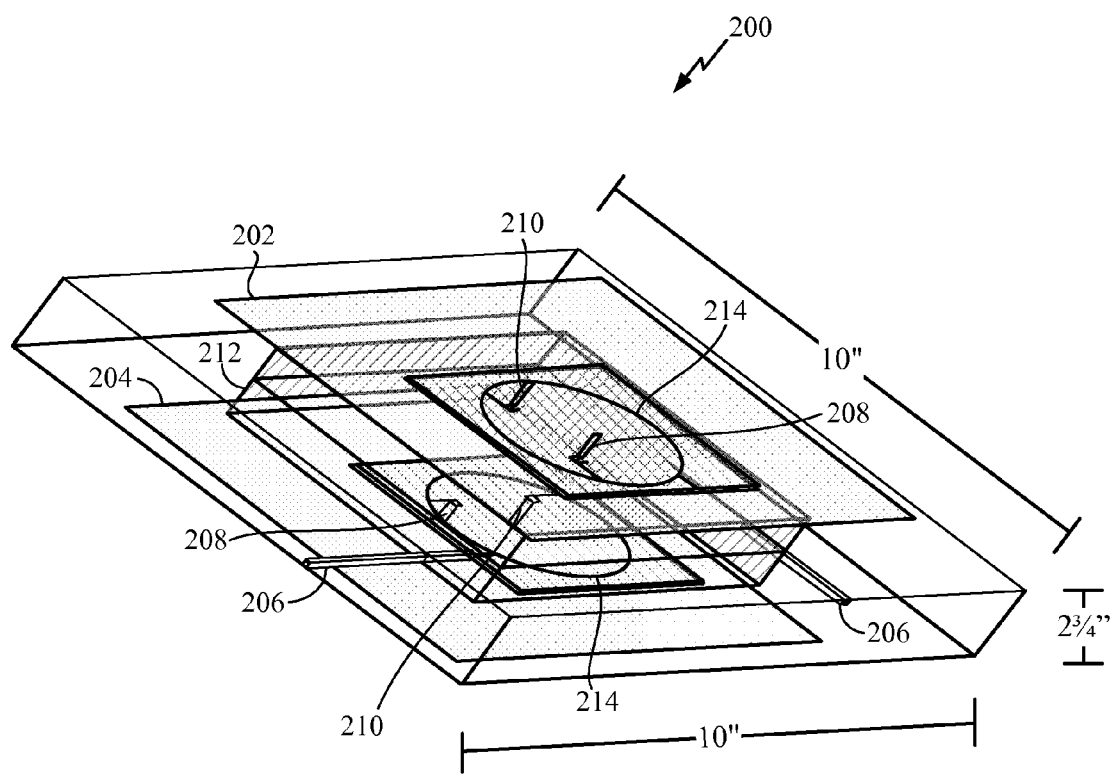
FIG. 2 is a schematic diagram of a repeater system using two patch antennas.

Repeater 102 may take many forms. In a first repeater design 200, as shown in FIG. 2, the repeater includes two dual-fed patch antennas (or, more generally, two dual-fed planar conductor radiating elements) 202 and 204 disposed on opposite faces of a thin housing 212 that serves as a ground plane for each of the patch antennas 202 and 204 as well as the housing for electronics associated with the repeater. Housing 212 connects the two dual-fed patch antennas 202 and 204. One of the dual-fed patch antennas (either the donor antenna or the coverage antenna) 202 or 204 is rotated 90 degrees with respect to the other dual-fed patch antenna so that the two patch antennas 202 and 204 generate fields that are orthogonal to each other (e.g., their respective radiations are cross-polarized). The repeater uses ground plane isolation and cross-polarization of antenna elements to minimize feedback between patch antennas 202 and 204. For example, orthogonally polarized antenna elements may be used on opposite faces of the repeater to radiate power in directions opposite to each other. Thus, the antenna elements of patch antenna 202 are aligned at right angles with the antenna element of patch antenna 204.

Each of the two dual-fed patch antennas 202 and 204 includes two microstrip antenna feed probes 208 and 210 that feed the patch antenna. Each of microstrip probes 208 and 210 may include a conducting strip separated from the ground plane by a dielectric layer known as the substrate. In order to reduce or eliminate radiation from the probes, the two microstrip probes 208 and 210 associated with each patch antenna 202 and 204 are fed 180 degrees out of phase. For example, phase shifting circuitry 214 (e.g., a rat-race circuit) may be connected to the two microstrip probes 208 and 210 associated with each patch antenna 202 and 204 and may be used to shift a feed signal inputted by a feed line 206 by 180 degrees. Feed line 206 may be connected to a coaxial line that extends from a perimeter of the ground plane to the microstrip line. The feed lines 206 of each patch antenna 202 and 204 are disposed perpendicular to each other. Each instance of phase shifting circuitry 214 is attached under the ground plane of each patch antenna (e.g., inside the thin housing 212) and may be additionally shielded (e.g., electromagnetically shielded) from each other to reduce or eliminate cross-talk noise. The overall dimensions of repeater design 200 may be approximately 10"×10"×2¾" (or within ±⅕ of each of the foregoing dimensions and additionally within standard manufacturing tolerances).

Housing 212 may include various repeater electronics and may additionally serve as the ground planes for patch antennas 202 and 204. The repeater electronics may include, for example, one or more signal amplifiers, signal processors, analog-to-digital converters (ADCs), digital-to-analog converters (DACs), clocks, and local oscillators. The signal processors may be configured to filter or enhance the received signal before retransmission. For example, the signal processor may perform various filtering and interference cancellation techniques (e.g., echo cancellation) on the received signal before amplifying and rebroadcasting the signal. Housing 212 may be composed of any conductive material (e.g., metal) suitable for a ground plane and may be slightly larger than the size of the two dual-fed patch antennas 202 and 204. One or both of dual-fed patch antennas 202 and 204 may be enclosed in a plastic radome to protect the antenna from damage (e.g., adverse weather or climate conditions).

In the first repeater design 200 (FIG. 2), the repeater may be disposed vertically with the ground planes of the patch antennas 202 and 204 (both of FIG. 2) perpendicular to the ground. In actual implementations, the repeater may be mounted in any suitable orientation. The donor patch antenna is generally disposed facing an area of good coverage while the coverage patch antenna is generally disposed facing an area of poor coverage. For example, the donor patch antenna may be disposed in an area of signal coverage that exceeds a predefined threshold signal strength or signal integrity. The coverage patch antenna may be disposed in an area of signal coverage that does not exceed the predefined (or some other) threshold signal strength or signal integrity.

Figure 3:
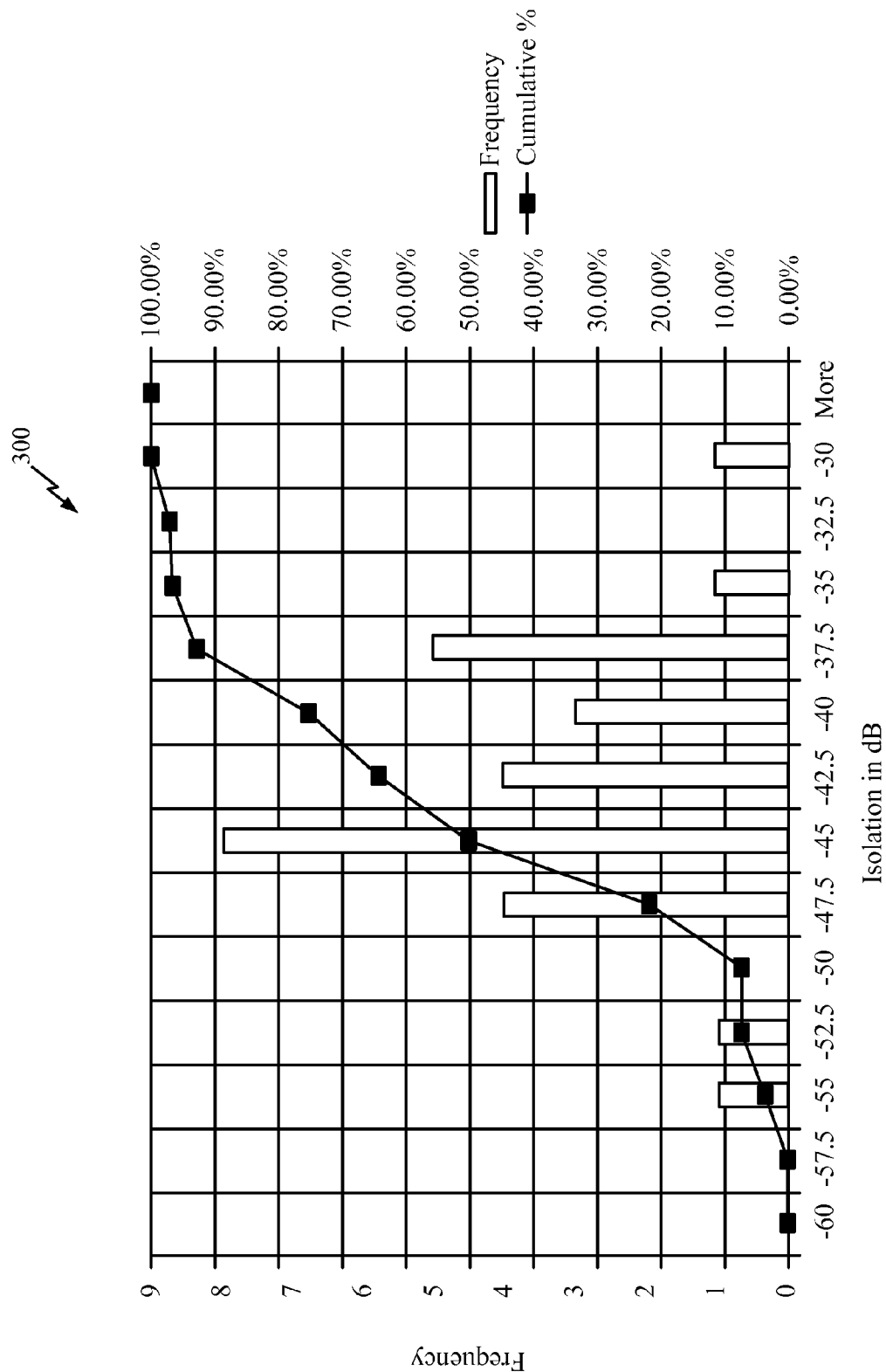
FIG. 3 is an isolation histogram of the repeater system of FIG. 2.

FIG. 3 shows histogram 300 that includes the results of a prototype antenna system built in accordance with first repeater design 200 (FIG. 2). The results shown in histogram 300 were measured in a scattering environment. Histogram 300 shows the probability distribution of the isolation between the donor antenna signal and the coverage antenna signal by depicting the frequency of observations of a particular isolation in a prototype system. As shown in histogram 300, isolation values between 55 dB and 30 dB were observed in the test environment with the most frequent isolation observations occurring near 45 dB. As described above, the isolation provided by the repeater design combined with interference cancellation techniques is expected to exceed 80 dB of total isolation between the donor antenna signal and the coverage antenna signal.

Figure 4:
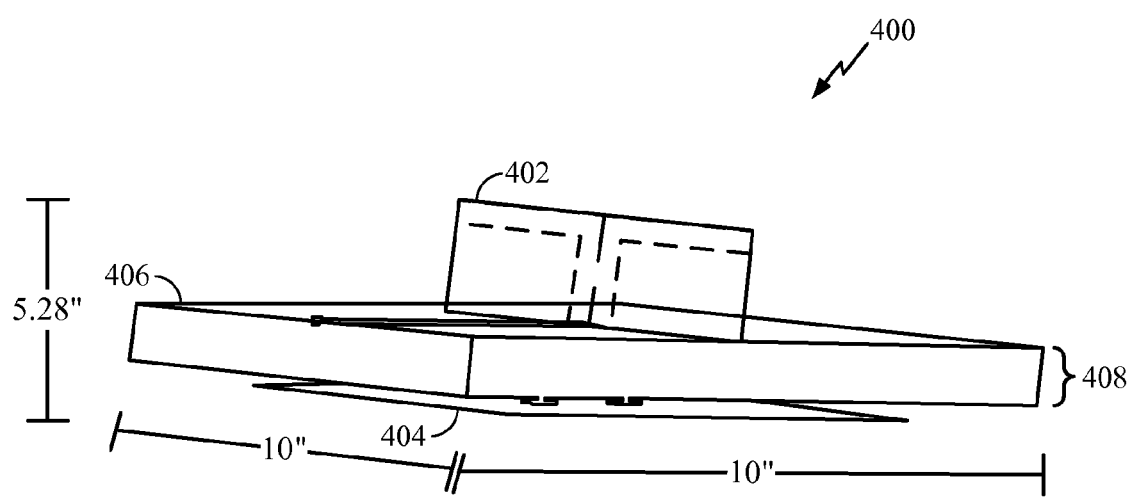
FIG. 4 is a schematic diagram of a repeater system using a patch antenna and a balanced dipole antenna.

In a second repeater design 400, as shown in FIG. 4, a dual-fed patch antenna 404 (as described above) is used for the donor antenna and a balanced dipole antenna 402 is used for the coverage antenna. Housing 406 may serve as the ground plane for one or more of the patch antenna 404 and the balanced dipole antenna 402 and may also house the repeater electronics. This design may yield better isolation between patch antenna 404 and balanced dipole antenna 402 than found in design 200 (FIG. 2), but may also be associated with a higher profile.

The dipole antenna 402 is a balanced dipole antenna that is center fed by a vertically-disposed microstrip probe. The microstrip probe excites a gap between wings of the dipole antenna such that current is outgoing on one wing and incoming on the other wing. The microstrip probe is fed by a line (e.g., a coaxial line) that extends over the ground plane of the dipole antenna. Alternatively, because the ground plane has a thickness 408 as shown in FIG. 4, the coaxial line could extend from a perimeter of the ground plane between the opposing sides of the ground plane (i.e., inside the housing). The overall dimensions of this antenna design may be approximately 10"×10"×5.28" (or within ±⅕ of each of the foregoing dimensions and additionally within standard manufacturing tolerances).

Figure 5:
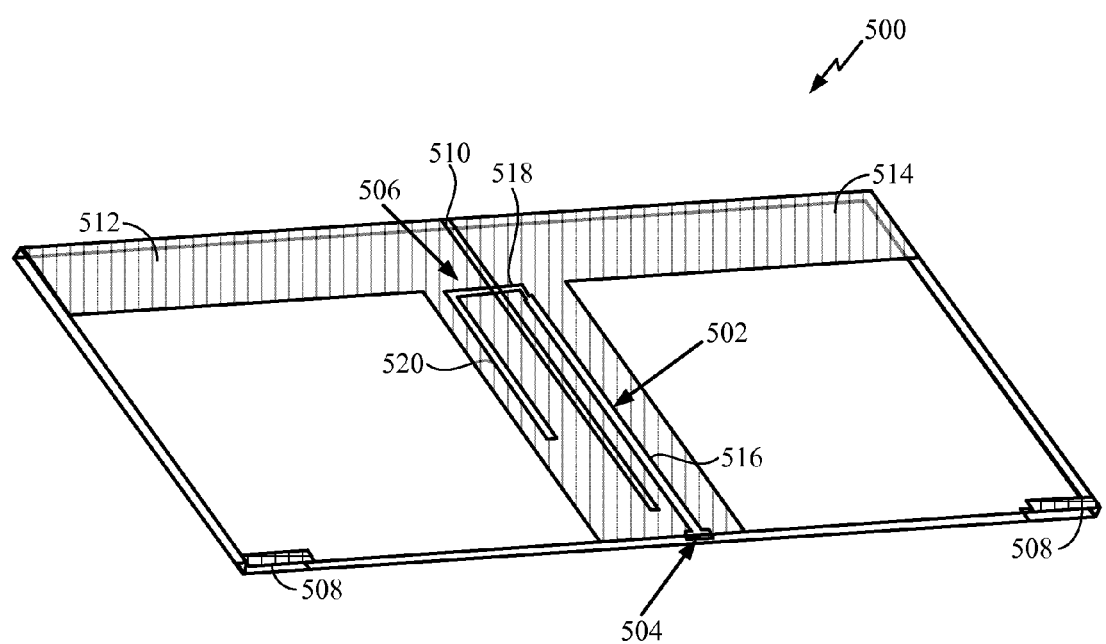
FIG. 5 is a schematic diagram of the balanced dipole antenna of FIG. 4.

Several different types of dipole antennas may be used for the balanced dipole antenna 402. Dipole antenna 500 of FIG. 5 is one such type of balanced dipole antenna that may be used. Dipole antenna 500 is a printed dipole antenna on a piece of PCB material (such as FR-4 epoxy). The PCB is shown as semi-transparent in the example of FIG. 5 for better visualization of the construction of the dipole antenna. The dipole wings 512 and 514 (e.g., the poise and counterpoise) and a quarter-wave balun (not shown) are printed on one side of the PCB while the feed trace 556 is printed on the other side. The feed trace 556 includes three segments 516, 518, 520 of a microstrip line. Each segment 516, 518, 520 may have a different width corresponding to a different characteristic impedance level. The dipole balun printed on the other side of the PCB serves as the ground plane for these microstrip lines. The segment of the microstrip line that crosses over a dipole gap 560 electromagnetically feeds the dipole. The impedance of this microstrip segment matches that of the dipole impedance $Z_a$ which is typically around 75 ohms at the gap 560. The dipole impedance is matched to a 50-ohm line 554 with the help of the middle microstrip line 552 which is a quarter-wave transformer. The impedance of the transformer, $Z_t$, is related to the antenna impedance at the gap $Z_a$, and the 50-ohm line 554 characteristic impedance, $Z_c$ in accordance with the following:

$$Z_t = \sqrt{Z_a Z_c} \qquad (1)$$

Although three segments 516, 518, 520 of a microstrip line are shown in the example of FIG. 5, more or fewer segments of one or more microstrip lines may be used in dipole antennas in other arrangements.

Two small metallic tabs 508 may be disposed on the lower edge of the dipole antenna 500. Metallic tabs 508 may not significantly affect the electrical operation of the dipole antenna 500, but are provided as an option for erecting the dipole antenna 500 on the ground plane by soldering the two metallic tabs 508 to the ground plane.

In the second repeater design 400 (FIG. 4), one or more of the ground planes of the patch antenna 404 and the dipole antenna 402 (both of FIG. 4) may be disposed perpendicular to the ground. In actual implementations, the repeater may be mounted in any suitable orientation. The donor antenna is generally disposed facing an area of good coverage while the coverage antenna is generally disposed facing an area of poor coverage. For example, the donor antenna may be disposed in an area of signal coverage that exceeds a predefined threshold signal strength or signal integrity. The coverage antenna may be disposed in an area of signal coverage that does not exceed the predefined (or some other) threshold signal strength or signal integrity.

Figure 6:
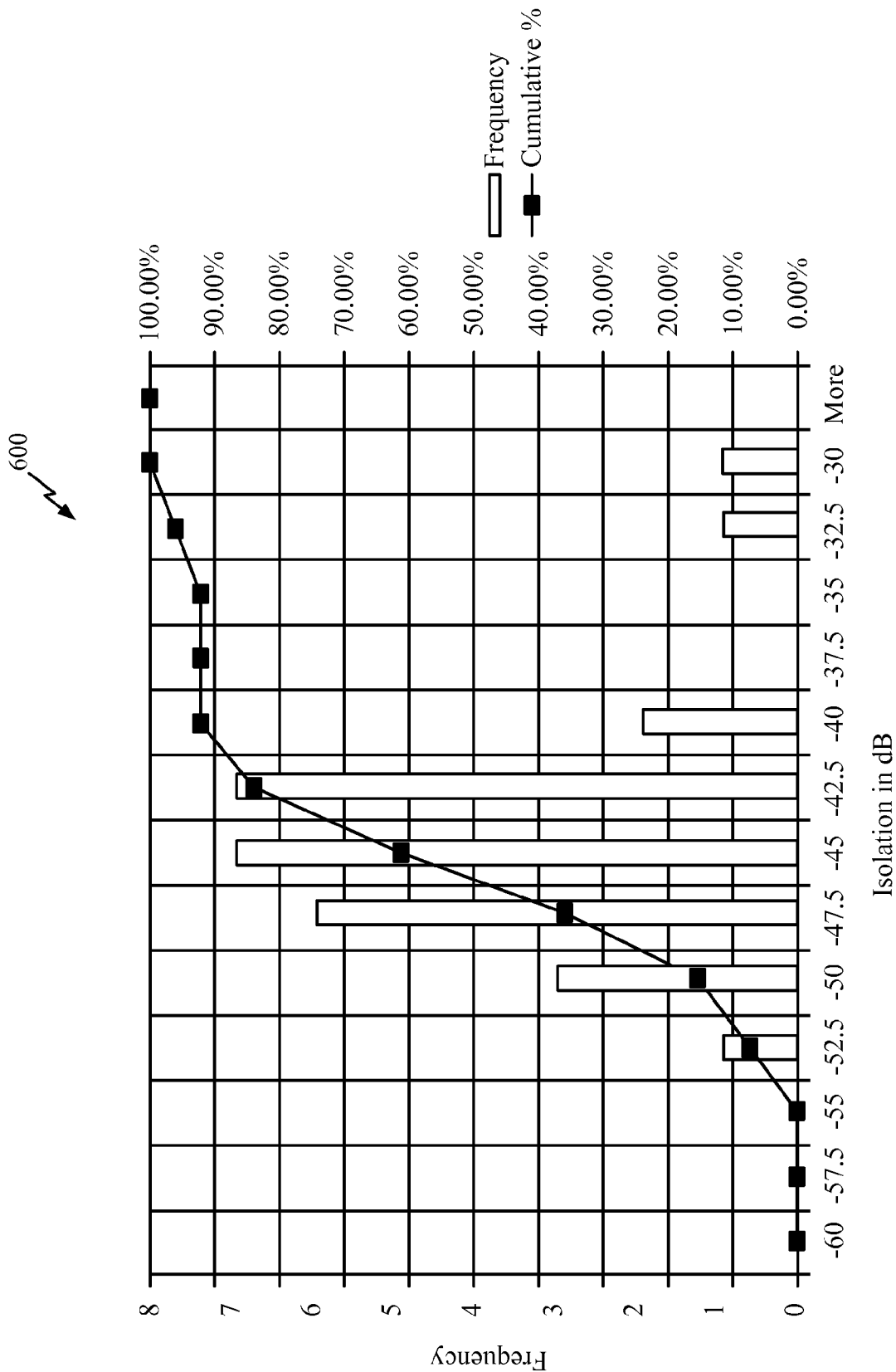
FIG. 6 is an isolation histogram of the repeater system of FIGS. 4 and 5.

FIG. 6 shows histogram 600 that includes the results of a prototype antenna system built in accordance with second repeater design 400 (FIG. 4). The results shown in histogram 600 were measured in a scattering environment. Histogram 600 shows the probability distribution of the isolation between the donor antenna and the coverage antenna by depicting the frequency of observations of a particular isolation in a prototype system. As shown in histogram 600, isolation values between 52.5 dB and 30 dB were observed in the test environment with the most frequent isolation observations occurring near 47.5 dB, 45 dB, and 42.5 dB. As described above, the isolation provided by the repeater design combined with interference cancellation techniques is expected to exceed 80 dB of total isolation between the donor antenna and the coverage antenna.

Figure 7:
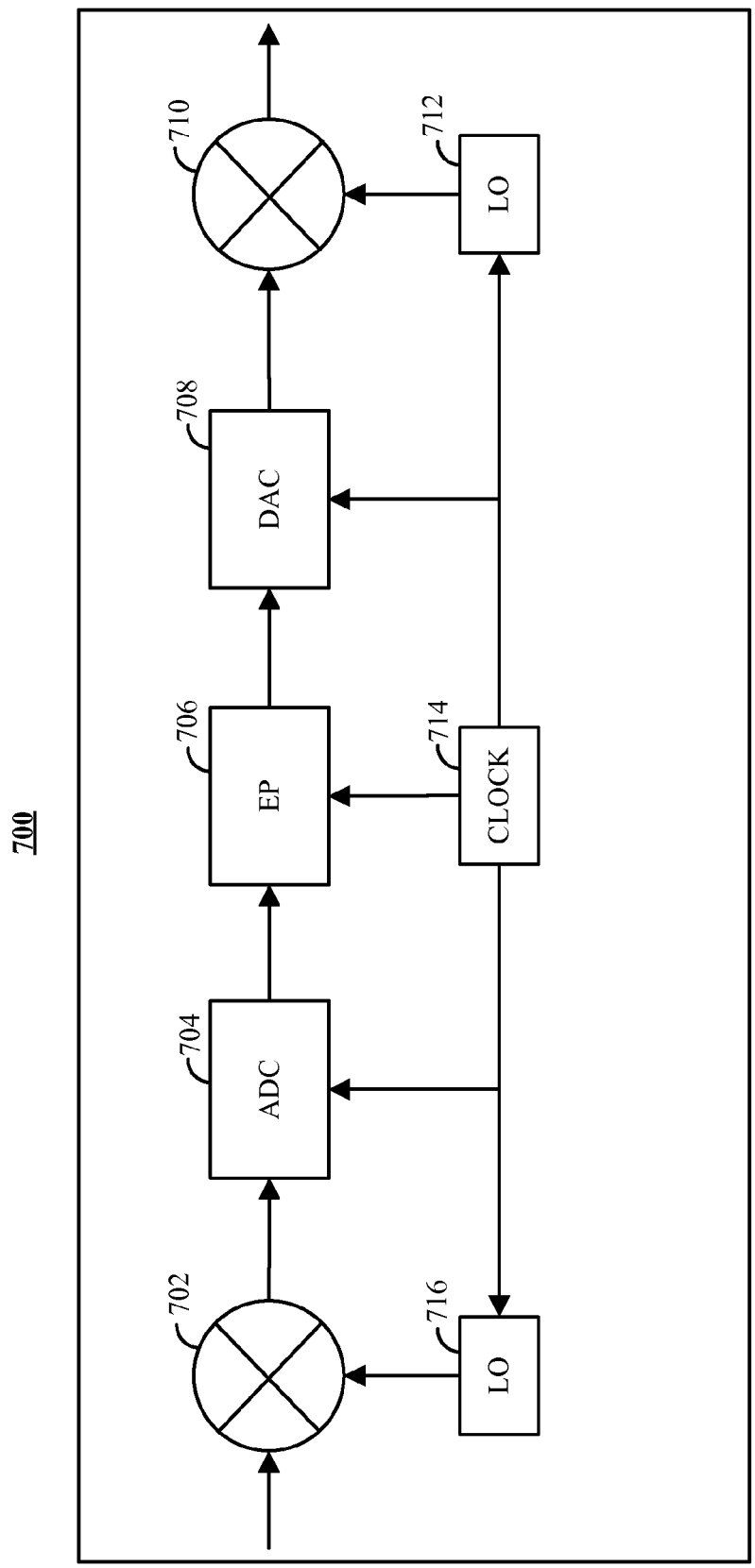
FIG. 7 is a simplified block diagram of an echo canceller.

With either design (e.g., first repeater design 200 (FIG. 2) or second repeater design 400 (FIG. 4), an echo canceller 700 as shown in FIG. 7 may be connected to the coverage and donor antennas to improve isolation between the coverage and donor antennas. The echo canceller 700 may be part of more general interference cancellation circuitry or signal processing circuitry that is included as part of the repeater electronics. The signal processing circuitry may be housed in housing 212 (FIG. 2) or housing 406 (FIG. 4) and may be independently shielded. The signal processor circuitry may provide further isolation between the donor and coverage antenna signals by detecting and attenuating signals coupled from the transmitter antenna to the receiver antenna for both the forward (downlink) channel and the reverse (uplink) channel. The signal processing circuitry may include a down-conversion mixer 702, analog-to-digital converter (ADC) 704, echo processor 706, digital-to-analog converter (DAC) 708, up-conversion mixer 710, local oscillators 712 and 716, and a clock 714.

The incoming RF signal from a low noise amplifier (LNA) may be down-converted to baseband (or intermediate frequency (IF)) by the down-conversion mixer 702 and local oscillator 716. The ADC 704 may convert the output of the mixer 702 to digital samples, which are stored in memory in the echo processor 706. The echo processor 706 may remove feedback (i.e., echoes and other interference) from the digital samples. The filtered samples are converted back to an analog signal by the DAC 708. The up-conversion mixer 710 and local oscillator 712 may up-convert the output of the DAC 708 to an RF signal that is fed to the input of the high power amplifier (HPA).

Alternatively, the ADC sampling may be performed in the RF band of the received signal or at an IF level. The samples may be taken over a time interval that represents the maximum propagation time expected for the latest arriving echo, generally less than 1 microsecond for an in-building or home environment. To reduce the throughput of sampled data (e.g., in bits/sec), sub-Nyquist sampling rates in either the RF band or in the IF band may be used. The ADC may have a dynamic range and sampling frequency to differentiate the original, non-delayed signal from the amplified, delayed echo.

The echo processor 706 may search for any time-delayed echoes in the sampled data and subtract any detected echoes from the sampled data stream. In order to reduce the correlation between the original signal and echoed signals, the resulting signal samples are typically delayed in a delay buffer for a time specified by a controller of echo processor 706. Conventional auto-correlation methods may be used to determine the time delay of each echo. The echo detection and echo subtraction may occur serially or in multiple parallel branches, one for each expected echo. Various other techniques for echo cancellation and interference cancellation using echo processor 706 may additionally or alternatively be used in other embodiments.

Various modifications, alternative constructions, and equivalents may be used without departing from the scope of the disclosure. For example, one or more elements described above may be a component of a larger system, wherein other rules may take precedence over or otherwise modify the application of the particular example or element. Also, a number of steps may be undertaken before, during, or after the above elements are considered. Accordingly, the above description does not limit the scope of the disclosure, including the appended claims, to the examples provided.

What is claimed is:

1. A repeater system comprising:
a dual-fed donor patch antenna comprising a first microstrip antenna probe and a second microstrip antenna probe;
phase shifting circuitry connected to the first microstrip antenna probe and the second microstrip antenna probe, the phase shifting circuitry configured to:
receive an input signal,
supply a first signal to the first microstrip antenna probe, and
supply a second signal to the second microstrip antenna probe using the input signal such that the first signal and the second signal are approximately 180 degrees out of phase with respect to each other;
a coverage antenna; and
a housing connecting the dual-fed donor patch antenna and the coverage antenna.

2. The repeater system of claim 1 wherein the coverage antenna comprises a dual-fed coverage patch antenna comprising a third microstrip antenna probe and a fourth microstrip antenna probe.

3. The repeater system of claim 2 wherein the dual-fed donor patch antenna and the dual-fed coverage patch antenna are disposed so that their respective radiations are cross-polarized.

4. The repeater system of claim 3 wherein an overall dimension of the repeater system is approximately 10"×10"× 2¾".

5. The repeater system of claim 1 wherein the phase shifting circuitry comprises a rat-race circuit.

6. The repeater system of claim 5 wherein the rat-race circuit is electromagnetically shielded from other phase shifting circuitry in the repeater system.

7. The repeater system of claim 1 wherein the dual-fed donor patch antenna is configured to receive signals in the frequency band of 716 MHz to 728 MHz and the coverage antenna is configured to retransmit signals in the frequency band of 716 MHz to 728 MHz.

8. The repeater system of claim 7 wherein the repeater system is configured to receive and transmit forward link only (FLO) traffic.

9. The repeater system of claim 1 wherein the housing is composed of electrically conductive material.

10. The repeater system of claim 9 wherein the housing is disposed to provide a ground plane for the dual-fed donor patch antenna and the coverage antenna.

11. The repeater system of claim 1 wherein the coverage antenna comprises a balanced dipole antenna.

12. The repeater system of claim 11 wherein the balanced dipole antenna comprises a quarter-wave balun printed on a first side of a printed circuit board (PCB) material.

13. The repeater system of claim 12 wherein the balanced dipole antenna comprises a feed trace printed on a second side of the PCB material, wherein the first side is different from the second side.

14. The repeater system of claim 13 wherein the feed trace comprises at least three segments of microstrip lines, each segment comprising a different width corresponding to a different characteristic impedance level.

15. The repeater system of claim 11 wherein an overall dimension of the repeater system is approximately 10"×10"× 5.28".

16. The repeater system of claim 1 further comprising interference cancellation circuitry configured to identify and subtract echoes from a sampled data stream.

17. The repeater system of claim 16 wherein the interference cancellation circuitry is configured to provide a total isolation between the dual-fed donor patch and the coverage antenna of at least 80 dB.

18. A repeater system comprising:
- a first patch antenna comprising a first feed line and first and second feed probes;
- a second patch antenna comprising a second feed line and third and fourth feed probes, wherein the second patch antenna is disposed so that the first patch antenna and the second patch antenna generate orthogonal fields; and
- a housing connecting the first patch antenna and the second patch antenna and comprising first and second phase shifting circuitry, wherein:
  - the housing is disposed to provide a ground plane for the first patch antenna and the second patch antenna;
  - the first phase shifting circuitry is configured to receive a first input signal on the first feed line, supply the first input signal to the first feed probe, phase shift the first input signal by approximately 180 degrees, and supply the first phase-shifted input signal to the second feed probe; and
  - the second phase shifting circuitry is configured to receive a second input signal on the second feed line, supply the second input signal to the third feed probe, phase shift the second input signal by approximately 180 degrees, and supply the second phase-shifted input signal to the fourth feed probe.

19. A repeater system comprising:
- a dual-fed donor patch antenna comprising a first microstrip antenna probe and a second microstrip antenna probe;
- means for receiving an input signal,
- means for supplying a first signal to the first microstrip antenna probe, and
- means for supplying a second signal to the second microstrip antenna probe using the input signal such that the first signal and the second signal are approximately 180 degrees out of phase with respect to each other;
- a coverage antenna; and
- means for connecting the dual-fed donor patch antenna and the coverage antenna.

20. The repeater system of claim 19 further comprising means connected to the means for receiving the input signal for identifying and subtracting echoes from a sampled data stream.

* * * * *